Dec. 18, 1962  C. L. SUMMERS  3,068,924
NUT ASSEMBLY
Filed April 18, 1958  2 Sheets-Sheet 1
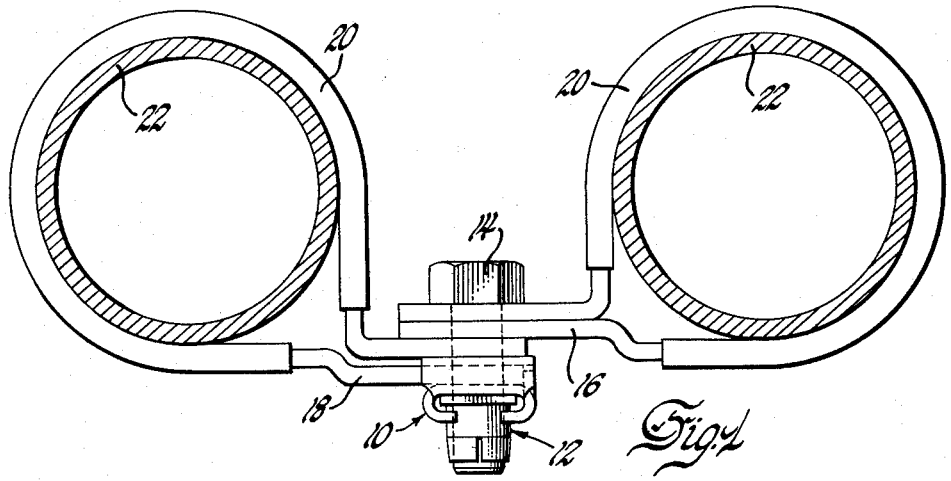
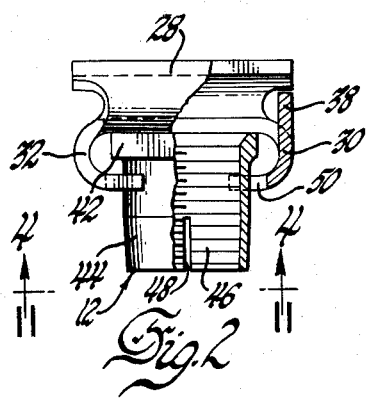
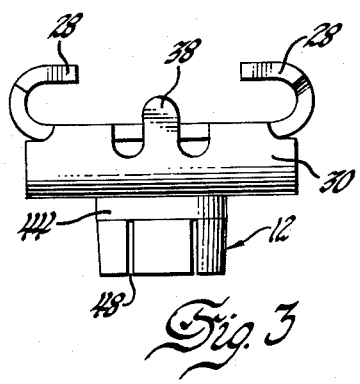
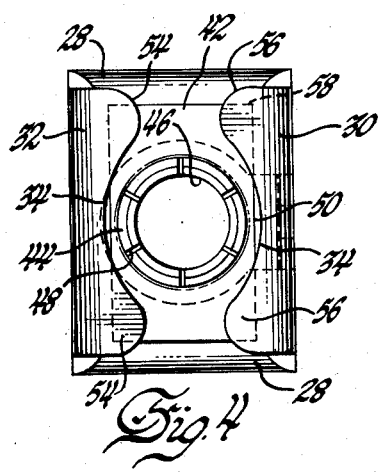
INVENTOR.
Charles L. Summers
BY
C.D. Burch
ATTORNEY Dec. 18, 1962 C. L. SUMMERS 3,068,924
NUT ASSEMBLY
Filed April 18, 1958 2 Sheets-Sheet 2

INVENTOR.
Charles L. Summers
BY
D. Burch
ATTORNEY

United States Patent Office 3,068,924
Patented Dec. 18, 1962

3,068,924
NUT ASSEMBLY
Charles L. Summers, Indianapolis, Ind., assignor to General Motors Corporation, Detroit, Mich., a corporation of Delaware
Filed Apr. 18, 1958, Ser. No. 729,434
2 Claims. (Cl. 151—41.7)

This invention relates generally to supporting clamps for conduits and the like, in engine installations and more particularly to a nut and nut retainer assembly therefor.

In fastening clamps to conduits in aircraft engine installations, space problems present definite limitations on the type of fasteners to be used and upon the accessible space available to the operator fastening such clamps and devices. Much difficulty has been had in the past in attempting to thread a bolt into a nut means of some type in hard to reach and out of the way places, the operation involving placing a wrench on a nut, holding the nut and wrench in place, aligning the members to be fastened together, and inserting a bolt to secure the pieces. Obviously, in inaccessible spots, the operator will have much difficulty in handling all the operations necessary at one time, in the absence of some type of nut retainer means.

The device in which this invention is embodied comprises a nut retainer member and nut assembly, that is inexpensive to produce and provides positive retention for the nut while the bolt is being threaded therein. The device further locates the nut with respect to the bolt receiving holes in the parts to be joined, making it necessary for the operator to deal only with the bolt itself. The device provides an inexpensive means of retaining the nut, provides a faster fastening operation, and eliminates problems due to space limitations and inaccessible locations.

These and other advantages will become apparent in the following drawings and specification.

In the drawings:

FIGURE 1 is a view of the retainer and nut assembly embodying this invention, in a typical engine installation.

FIGURE 2 is an enlarged view of the assembly shown in FIGURE 1 with parts broken away and in section, to illustrate the structure of the assembly.

FIGURE 3 is a side view of the device illustrated in FIGURE 2.

FIGURE 4 is an end view of the assembly of FIGURE 2 taken along the line 4—4 and looking in the direction of the arrows.

Figure 5:
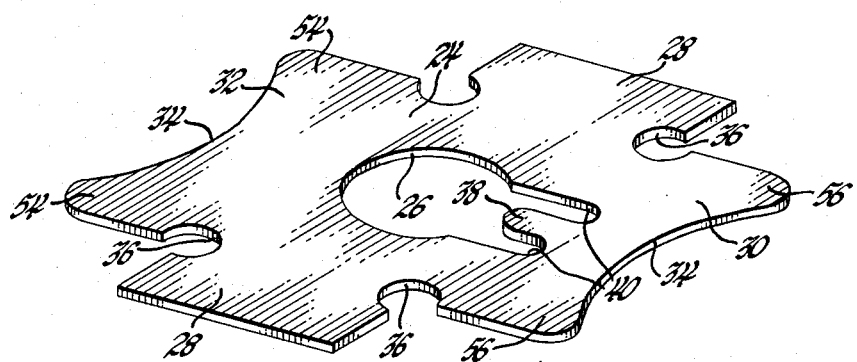
FIGURE 5 shows the developed form of the retainer member of FIGURES 1 through 4.

Referring more particularly to the drawings, the retainer clamp, illustrated generally by the numeral 10 in FIGURE 1, and the nut 12 are shown secured to a bolt member 14 passing through the flanges 16 and 18 of the pipe clamps 20 surrounding the conduits 22. It is intended that this drawing show only one illustration of the use of the assembly and it is not to be restricted to the particular type of installation shown.

Figure 6:
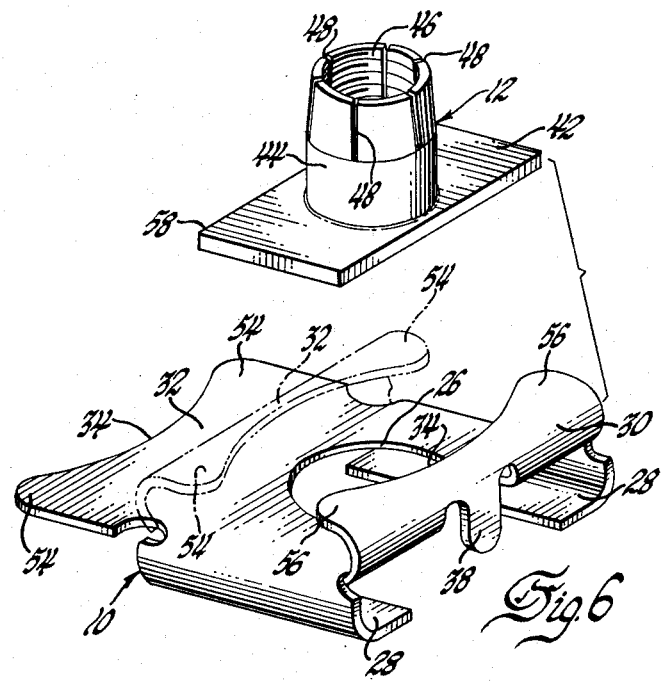
FIGURE 6 shows an exploded view of the assembly of FIGURE 2 to illustrate the relative location of parts.

FIGURE 5 shows the developed form of the nut retainer 10. A flat central portion 24 has a bolt receiving aperture 26 in the center and arms extending therefrom in all four directions. The arms 28 are adapted to be bent downwardly and inwardly, as shown in FIGURE 6, providing a channel between the arms to receive the flange member 18 therebetween. The arms 30 and 32, disposed at 90° to each of the arms 28, are arcuately formed at 34 and are adapted to be bent axially and inwardly, in a direction opposite to that of the arms 28. A recess is thus formed between the arms 30 and 32, in the formed position, which centers over the bolt receiving aperture 26 in the central portion 24. The circular cutouts 36 formed at each of the corners of the retainer member are provided to prevent tearing of the retainer member as the various arms are formed to their final positions.

A tab member 38 is formed in the arm 30 by cutting a pair of slots 40 from the bolt receiving aperture 26 toward the arcuate portion 34 of the arm 30. The projection thus formed, when the arm 30 is bent axially and inwardly, will project into the channel formed between the arms 28 and provide a stop for locating the end of the flange member 18, received in the channel between the arms 28. The relation of the projection 38 to the bolt receiving aperture 26 is such that when the retainer member is properly positioned on the flange member 18 and the projection 38 abuts the end of the clamp member 18, the bolt receiving aperture 26 in the retainer member will be aligned with a bolt receiving hole in the clamp member 18.

The nut member 12 is retained in the retainer member by the axially and inwardly bent arms 30 and 32. As best seen in FIGURE 6, the nut member 12 consists of a flat elongated head portion 42, which has a bolt receiving hole therein, and an axially extending cylindrical portion 44, which has internal threads 46 to receive the bolt. The cylindrical portion 44 has a plurality of slots 48 around the circumference to provide a self-locking or clamping action on the bolt member when the bolt is threaded through the nut.

Before forming the axially and inwardly extending arms 30 and 32 of the retainer member, or after bending one and before bending the other, the head portion 42 of the nut member is placed on the central portion 24 of the retainer member and over the aperture 26. The arms 30 and 32 are then formed over the head portion 42 to secure the nut member in the retainer. The nut is allowed a few degrees of rotation before the corners 58 of the head portion contact the side walls of the recess formed the arms 30 and 32. The cylindrical portion of the nut member fits loosely between the now opposed arcuate faces of the arms 30 and 32 and a clearance 50 is provided at either side, between the arcuate surface and the cylindrical portion of the nut. It will be noted that the distance between the ears 54 of the arm 32 and the ears 56 of the arm 30 is less than the diameter of the cylindrical portion 44 of the nut. Thus, a limited amount of movement is allowed the nut member in any direction in the retainer member to aid in aligning the bolt with the nut member.

The assembled form of the nut retainer and nut member is best shown in FIGURES 2 and 3, and it may be seen that the clamp member is receivable in the channel formed between the axially and inwardly extending arms 28 and is located therein by the projection 38. Thus an operator may place the nut assembly in place on one of the clamp members, such as 18, and needs only to pass the bolt through the remaining clamp members and into the retainer and nut assembly. The wrench is eliminated, since the nut cannot turn within the retainer, and the nut is held in a proper position relative to the flanges and retainer for a simple fastening operation.

I claim:

1. Fastening means comprising a retainer member having a central bolt receiving aperture therein, longitudinal arms formed from said retainer member and axially and inwardly extending and forming a channel therebetween for receiving a part to be fastened, lateral arms formed from said retainer member and extending axially in a direction opposite to said first mentioned arms and inwardly and forming a nut receiving recess over the aperture in said retainer member, one of said lateral arms having an axially extending tab formed therefrom and projecting into said channel formed by said longitudinal arms and adapted to engage the end of the part to be fastened and locate the part to be fastened within said channel between said longitudinal arms, and a nut member receivable in said recess formed by said lateral arms, said nut member having limited movement within said recess for ease in aligning a bolt member in said part to be fastened and in said retainer member.

2. Fastening means for securing a plurality of parts together, one of said parts being a strap-like member having a bolt receiving aperture therein, said fastening means comprising a nut retainer having a bolt receiving aperture therethrough corresponding to said aperture in said strap-like member, first axially and inwardly extending arms formed from said retainer and defining a channel therebetween to receive said strap-like member, second axially and inwardly extending arms formed from said retainer and defining a recess adjacent said bolt receiving aperture, an axially extending tab formed from one of said last-named arms to abut the end of said strap-like member and align the bolt receiving apertures in said strap-like member and said retainer, a nut receivable in said recess defined by said last named arms and having limited free floating movement therein, said nut having a flat head portion disposed within said last named extending arms to limit axial movement thereof with respect to said retainer and a cylindrical internally threaded axially extending portion for receiving a bolt therein, and a bolt member receivable through said parts to be secured and through said retainer and into said nut for fastening said parts together.

References Cited in the file of this patent

UNITED STATES PATENTS

| | | |
|---|---|---|
| 2,542,375 | Torresen | Feb. 20, 1951 |
| 2,717,622 | Flora | Sept. 13, 1955 |
| 2,724,419 | Poupitch | Nov. 22, 1955 |

FOREIGN PATENTS

| | | |
|---|---|---|
| 483,089 | Great Britain | Apr. 12, 1938 |
| 532,830 | Great Britain | Jan. 31, 1941 |
| 1,104,931 | France | June 22, 1955 |
| 1,126,445 | France | July 30, 1956 |